April 29, 1958  M. BAERMANN  2,832,932

MAGNET ARRANGEMENT FOR THE PRODUCTION OF EDDY CURRENTS

Filed Aug. 5, 1952

INVENTOR
MAX BAERMANN
BY

United States Patent Office 2,832,932
Patented Apr. 29, 1958

2,832,932

MAGNET ARRANGEMENT FOR THE PRODUCTION OF EDDY CURRENTS

Max Baermann, Bensberg-Wulfshof, Koln, Germany

Application August 5, 1952, Serial No. 302,684

Claims priority, application Germany August 7, 1951

10 Claims. (Cl. 324—152)

This invention relates to a magnet arrangement for the production of eddy currents, wherein an electric conductor is moved in an air gap formed by two permanent magnets or one permanent magnet with a return yoke. In such magnet arrangements, the problem arises of producing in the working air gap with the use of a minimum amount of magnetic material, a magnetic field which sets up a great eddy-current braking effect.

In known constructions, most of which comprise plane pole faces, attempts have been made to solve this problem by varying the pole faces and/or the air-gap induction. In such cases, the braking force has been adjusted by pivoting the magnetic systems in relation to the conductor or by providing adjustable magnetic shunts. In the known arrangements, however, the utilisation of the magnet material is unsatisfactory, since part of the field is uniform owing to the plane pole faces and therefore cannot contribute to the formation of eddy currents. On the other hand, the adjustment in the known systems gives rise to difficulties in construction. Finally, shunts have the disadvantage that the working point of the magnet moves along the demagnetisation curve, so that the regulation curve is not reversible. It is, of course, known in magnetics to increase the non-uniformity of the magnetic field, or to impart a favourable form thereto, by tapering the poles to a point or fashioning them in a particular manner, so that a high utilisation factor is obtained in regard to the braking action. Poles of such form, however, are costly to produce, and they have therefore not been adopted in practice for reasons of economy.

The present invention aims at obviating the foregoing difficulties and drawbacks in an economical manner and, to this end, consists in a magnet arrangement for the production of eddy currents wherein the magnets are fashioned in cylindrical form and magnetised perpendicularly to their axes i. e. with a diametrically extending axis of magnetic polarization. Magnets of such form can be cheaply produced by casting, sintering or pressing. This cylindrical form also gives a particularly satisfactory utilisation factor of the magnetic material from the physical viewpoint, because the braking action is considerably increased owing to the favourable field distribution in the working air gap.

According to a feature of the invention, the magnet arrangement may consist of a cylindrical magnet and a pole shoe situated opposite thereto, or of two oppositely situated cylindrical magnets, the return taking place through a ferromagnetic yoke.

Moreover, in accordance with a further feature of the invention, two or more such magnets or pairs of magnets may be arranged in juxtaposition to one another and connected together by a return yoke.

In a still further feature of the invention, the cylindrical magnets are rotatably mounted on their longitudinal axes, so that they can be rotated by a driving mechanism, whereby the braking action can be adjusted within wide limits. In addition, by virtue of this possibility of rotation, the lines of force can be entirely or partially deflected from the working air gap, so that they are directly closed from pole to pole without passing through the conductor. According to the invention, this is achieved by a displacement of the magnets from the parallel position of the magnetisation axes in such manner that the unlike poles facing the air gap are moved towards one another. With correct dimensions, it is possible to effect this deflection of the lines of force without any substantial displacement of the working point of the magnets occurring.

When employing such magnet arrangements in precision measuring instruments, such for example as electricity meters, it is frequently necessary to compensate for the temperature dependence of some materials which influence the magnitude to be measured. This is achieved in a manner known per se by providing a magnetic shunt consisting of ferromagnetic material having a low Curie point. According to the invention, this shunt is provided on the end face of the cylinders in the form of a ring or the like, which ring may, if desired, also serve for edge protection. Alternatively, such shunts may be arranged, for example at the centre of the cylindrical body.

In order that the invention may be more readily understood, reference is made to the accompanying drawings, which illustrate diagrammatically and by way of example, several embodiments thereof, and in which.

Figure 1:
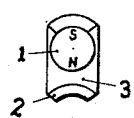
Figure 1 is a front elevation of a cylindrical magnet having a return yoke.
Figure 2:
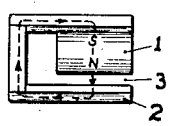
Figure 2 is a side elevation of the magnet according to Figure 1.
Figure 10:
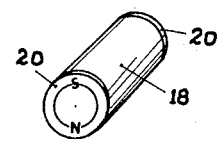
Figures 10 and 11 are perspective views of a cylindrical magnet having temperature compensation rings of different construction.
Figure 3:
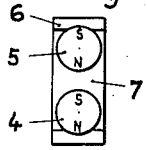
Figure 3 is a front elevation of two magnets having a return yoke.
Figure 4:
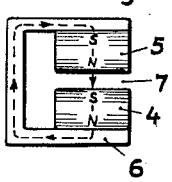
Figure 4 is a side elevation of the magnet arrangement according to Figure 3.
Figure 11:
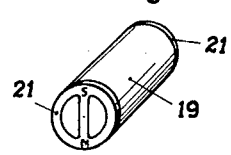
Figure 5:
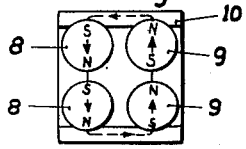
Figure 5 is an elevation of a magnet arrangement comprising two pairs of cylindrical magnets having a return yoke.
Figure 6:
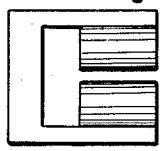
Figure 6 is a side elevation of the arrangement according to Figure 5.
Figure 7:
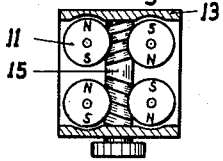
Figure 7 shows an arrangement according to Figure 5 with an adjusting arrangement comprising worms and worm wheels, in the position for maximum braking action.
Figure 8:
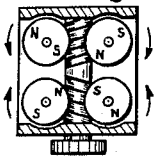
Figure 8 shows the same arrangement as Figure 7, but in a position for reduced braking action.
Figure 9:
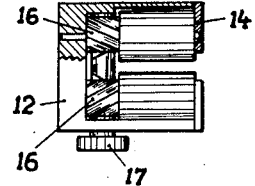
Figure 9 is a side elevation of the arrangement according to Figures 7 and 8.

The magnet arrangement according to Figures 1 and 2 consists of a cylindrical magnet 1, which is magnetised perpendicularly to its axis, and a return yoke 2. Between the two is formed a working air gap 3, through which an electric conductor (not shown) is moved. In the arrangement according to Figures 3 and 4, two cylindrical magnets 4 and 5 are secured in a return yoke 6. A working air gap 7 is formed between these two magnets. The arrangement according to Figures 5 and 6 consists of two pairs of magnets 8 and 9, which are arranged in a return yoke 10. In this magnet arrangement and in the arrangements according to Figures 1 to 4, the path followed by the lines of force is indicated by dashed lines and arrows. In the embodiments shown in Figures 7 to 9, cylindrical magnets 11 are rotatably mounted on the one hand in a connecting web 12 of two return yokes 13 and on the other hand in a bearing plate 14 of non-ferromagnetic material. Relative displacement of the magnets is effected by means of a spindle 15, on which two oppositely threaded worms are provided. These worms are in direct engagement with worm wheels 16 secured to the magnetic cylinders. The displacement is effected by turning the knob 17 secured to the worm spindle 15. Temperature compensation rings 20 and 21 of ferromagnetic material having a low Curie point are provided on the end faces of the cylindrical magnets 18 and 19, respectively (see Figs. 10 and 11). These rings serve at the same time for edge protection.

I claim:

1. A magnet arrangement for the production of eddy currents in a relatively movable electrically conductive member comprising in combination: first and second magnetically permeable members having spaced opposed parallel convex surfaces defining therebetween an air gap through which the electrically conductive member is adapted to move and be braked by eddy currents induced therein, at least said first member being a permanent magnet polarized so as to have its convex surface with one magnetic polarity only and a remote surface with an opposite polarity and yoke means of magnetically permeable material extending between said second member and said remote surface.

2. A magnet arrangement for the production of eddy currents in a relatively movable electrically conductive member comprising in combination: first and second magnetically permeable members having spaced opposed parallel convex surfaces defining therebetween an air gap through which the electrically conductive member is adapted to move and be braked by eddy currents induced therein, at least said first member being a permanent magnet in the shape of a cylinder with its arcuate side forming the convex surface and having a diametrically extending axis of polarization and yoke means of magnetically permeable material extending between said second member and the side of said first member remote from said second member.

3. A magnet arrangement for the production of eddy currents in an electrically conductive member relatively movable thereto comprising in combination: first and second magnetically permeable members having spaced opposed parallel convex surfaces defining therebetween an air gap through which an electrically conductive member is adapted to move and be braked by eddy currents induced therein, said first and second members being permanent magnets and both magnetically polarized so as to have the opposed portions of said convex surfaces of opposite magnetic polarity and a yoke member of magnetically permeable material extending between surfaces of both said first and second members remote from said opposed convex surfaces.

4. A magnet arrangement for the production of eddy currents in an electrically conductive member relatively movable thereto comprising in combination: first and second magnetically permeable members having spaced opposed parallel convex surfaces defining therebetween an air gap through which the electrically conductive member is adapted to move and to be braked by eddy currents induced therein, said first and second members both being permanent magnets generally in the shape of a cylinder with the axes parallel to each other, both said members having a diametrically extending axis of magnetic polarization whereby opposite diametrical sides of said cylindrical magnets are of opposite magnetic polarity and yoke means of magnetically permeable material extending between the sides of said members remote from said opposed parallel convex surfaces whereby to provide a return flux path for said cylindrical magnets.

5. The combination of claim 4 wherein means are provided for rotating said cylindrical magnets about their longitudinal axis whereby the flux in said air gap may be varied.

6. A magnet arrangement for the production of eddy currents comprising in combination: a plurality of pairs of first and second magnetically permeable members with each pair having spaced opposed parallel convex surfaces, each defining therebetween an air gap aligned with the air gap of other pairs through which air gap the electrically conductive member is adapted to move and be braked by eddy currents induced therein, said first and second member of each pair being a permanent magnet in the shape of a cylinder and with the axes of all of said members being parallel to each other, each of said members having a diametrically extending axis of magnetic polarization whereby opposite diametrical sides of each member form opposite magnetic poles, the opposed sides of each pair of members being of opposite magnetic polarization and adjacent pairs being oppositely magnetized and yoke means of magnetically permeable material extending between the sides of all of said members remote from said opposed convex surfaces.

7. The combination of claim 6 wherein all of said members are rotatable about their longitudinal axes and means for rotating all of such magnets simultaneously.

8. The combination of claim 2 wherein said cylindrical magnet has temperature compensation means provided on the end face thereof.

9. The combination of claim 2 wherein said cylindrical magnet has a ring of ferromagnetic material of low Curie point on at least one end face thereof.

10. The combination of claim 3 wherein at least one of said cylindrical magnets has a ring of ferromagnetic material of low Curie point on one axial end thereof whereby to provide temperature compensation means for such magnet.

References Cited in the file of this patent

UNITED STATES PATENTS

| 2,209,236 | Rowell | July 23, 1940 |
|---|---|---|
| 2,243,616 | Bing | May 27, 1941 |
| 2,353,618 | Lamb | July 11, 1944 |
| 2,422,714 | Bigelow | June 24, 1947 |
| 2,440,535 | Baranowski | Apr. 27, 1948 |
| 2,560,260 | Sturtevant | July 10, 1951 |

FOREIGN PATENTS

| 263,399 | Great Britain | Dec. 20, 1926 |
|---|---|---|
| 495,813 | Great Britain | Nov. 21, 1938 |
| 212,041 | Switzerland | Oct. 31, 1940 |
| 908,132 | France | Aug. 20, 1945 |